(12) United States Patent
Reynolds et al.

(10) Patent No.: US 10,690,027 B2
(45) Date of Patent: Jun. 23, 2020

(54) ATTACHMENT ARRANGEMENT BETWEEN ROLLING AND RIGID COMPONENTS IN A VEHICLE ENGINE BAY

(71) Applicant: Ford Global Technologies, LLC, Dearborn, MI (US)

(72) Inventors: Daniel Reynolds, Dearborn, MI (US); Juan Leal, Southfield, MI (US); Javier Motta-Mena, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 206 days.

(21) Appl. No.: 15/984,865

(22) Filed: May 21, 2018

(65) Prior Publication Data

US 2019/0353063 A1 Nov. 21, 2019

(51) Int. Cl.
| | |
|---|---|
| *G01B 3/28* | (2006.01) |
| *F01M 11/12* | (2006.01) |
| *B62D 25/08* | (2006.01) |
| *G01F 23/04* | (2006.01) |

(52) U.S. Cl.
CPC ........... *F01M 11/12* (2013.01); *B62D 25/082* (2013.01); *G01F 23/04* (2013.01)

(58) Field of Classification Search
CPC .................................................. F01M 11/12
USPC .................................................. 33/722–731
See application file for complete search history.

(56) References Cited

U.S. PATENT DOCUMENTS

| | | | | | |
|---|---|---|---|---|---|
| 2,127,835 | A | * | 8/1938 | Tower | G01F 23/04 33/725 |
| 2,216,360 | A | * | 10/1940 | Sweetland | F01M 11/045 184/1.5 |
| 2,760,636 | A | * | 8/1956 | Johnson | G01F 23/04 210/222 |
| 3,626,596 | A | * | 12/1971 | Manke | G01F 23/04 33/731 |
| 4,832,238 | A | * | 5/1989 | Taylor | B65D 25/48 141/337 |
| 5,289,898 | A | * | 3/1994 | Oberg | F01M 11/12 |
| 6,363,905 | B1 | | 4/2002 | Davis | |
| 8,671,977 | B2 | * | 3/2014 | Gonzales Sanz | B60S 1/50 137/565.17 |

(Continued)

FOREIGN PATENT DOCUMENTS

| | | |
|---|---|---|
| CN | 202992383 | 6/2013 |
| CN | 203685345 | 7/2014 |

(Continued)

*Primary Examiner* — George B Bennett

(57) ABSTRACT

A two-segment tube fluid level indicating system attached at one end to the vehicle's engine and at the other end to a fixed structure of the vehicle's engine bay is disclosed. The two-segment tube assembly includes a first tube segment having an end attached to the engine block and a second tube segment having an end attached to a fixed structure of the engine bay. The first tube segment is a common tube segment adapted for use with a given engine. The second tube segment is specific to a vehicle model. The first and second tube segments are axially and rotatably movable with respect to each other. A bracket having an elastomeric isolator attaches the second tube segment to the fixed structure. The movability of the first and second tube segments relative to each other and the elastomeric isolator operate to prevent damage to the tube portion during engine operation.

20 Claims, 10 Drawing Sheets

(56) References Cited

U.S. PATENT DOCUMENTS

| | | | | |
|---|---|---|---|---|
| 9,416,698 | B2* | 8/2016 | Meeks | F01M 11/0458 |
| 2008/0028630 | A1* | 2/2008 | Cho | G01F 23/04 |
| | | | | 33/726 |
| 2016/0003661 | A1* | 1/2016 | Shigemoto | G01F 23/04 |
| | | | | 33/730 |
| 2018/0238206 | A1* | 8/2018 | Demeulenaere | F01M 11/12 |
| 2019/0293469 | A1* | 9/2019 | Sonnenberg | G01F 23/04 |

FOREIGN PATENT DOCUMENTS

| | | |
|---|---|---|
| CN | 106352953 | 1/2017 |
| JP | 1164068 | 3/1999 |
| JP | 2013122204 | 6/2013 |

* cited by examiner

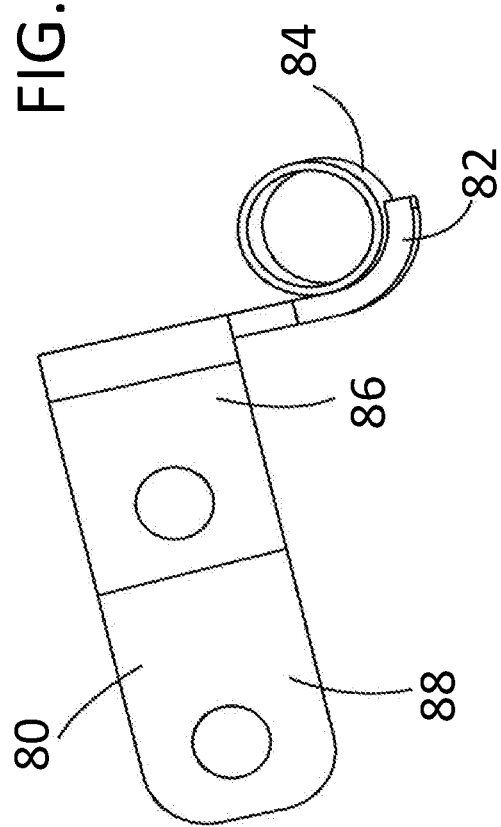

ATTACHMENT ARRANGEMENT BETWEEN ROLLING AND RIGID COMPONENTS IN A VEHICLE ENGINE BAY

TECHNICAL FIELD

The disclosed inventive concept relates generally to a fluid level indicating system for an internal combustion engine. More particularly, the disclosed inventive concept relates to an attachment arrangement for a fluid level indicating system in the form of a segmented tube attached between a rolling component, such as the vehicle engine, and a rigid component, such as the vehicle body. The segmented tube includes a first tube segment fluidly associated with the fluid reservoir and a second tube segment attached to the first tube segment and to the rigid component. The first and second tube segments are axially and rotatably movable with respect to each other.

BACKGROUND OF THE INVENTION

Internal combustion engines an oil lubrication system to reduce or eliminate friction between internal moving components. These oil lubrication systems typically incorporate an oil filter that continuously filters the circulating engine oil. The filtration process extends the useful life of the lubricating oil.

The typical oil lubrication system of the modern internal combustion engine includes an oil fill hole and an oil drain hole. To measure the oil level in the engine, conventional fluid level indicating systems have generally included a level indicating embodied as a weighted wire, a rod, or a thin, flexible blade. The wire, rod, or blade is graduated at one end for indicating depth. The level indicating is allowed to pass through a tube and into the oil of the engine's crankcase sump so as to provide a direct oil level reading within the engine. Known fluid level indicating systems have typically used externally mounted tubes that sometimes extend through a sidewall of a cylinder block.

The indicating tubes of known fluid level indicating systems have certain durability requirements that require them to be formed from steel. In addition, the interior bore must be sufficiently smooth so as to permit the removable level indicating to be readily withdrawn from the indicating tube and re-inserted into the indicating tube without restriction.

Ease of removal and reinsertion of the level indicating is one important consideration in the design and execution of a fluid level indicating system. Another important consideration is the placement of the level indicating tube as the gripping portion of the level indicating must be reasonably accessible to the vehicle operator. An additional aspect of the fluid level indicating system is that it be relatively inexpensive to manufacture and install. A final aspect of the fluid level indicating system is that it must be durable.

Historically, it has been virtually impossible to satisfy the objectives of ease of removal and reinsertion, convenient placement for easy access, low cost for manufacturing and assembly, and high durability. Perhaps the most difficult of these goals to achieve is the challenge created by engine packaging. Given the trend of placing a greater number of engine components into a more restricted space, practical accessibility of the level indicating is often compromised by the fact that level indicating tubes occupy space which is almost always at a premium in modern automotive vehicle engine compartments. Further complicating the situation for designers is the fact that it is common in the automotive industry to use the same engine between several body types and thus between different engine compartment configurations. Often each body type requires its own oil indicating tube having specific lengths and bends so as to accommodate variations in the engine and the engine compartment.

A conventional fluid level indicating system is illustrated in FIG. 1. As illustrated in this figure, an internal combustion engine 10 is shown in an elevated side view. The internal combustion engine 10 includes an engine block 12 having an exhaust manifold 14. A single, pre-formed oil indicating tube 16 is conventionally attached to the engine block 12 at an attachment point 18. A dipstick 20 is shown inserted into the indicating tube 16. The indicating tube 16 has the attachment point 18 and may be secondarily attached to the engine block 12 at an additional point (not illustrated).

As in so many areas of vehicle technology there is always room for improvements related to the design of an engine lubricating system for use in an conjunction with internal combustion engine. Particularly, it would be advantageous to provide a fluid level indicating system that may be universally adapted for use in a variety of different vehicles while providing accessibility and durability coupled with relatively low production and assembly costs.

SUMMARY OF THE INVENTION

The disclosed inventive concept overcomes the problems of known fluid level indicating systems by providing a two-segment tube assembly that may be attached at one end to the vehicle's engine and at the other end to a fixed structure of the vehicle's engine bay. The two-segment tube assembly includes a first tube segment having an end attached to the engine block and a second tube segment having an end attached to the fixed structure. The first tube segment is a common tube segment adapted for use with a given engine. The second tube segment is specific to a given vehicle model. The first and second tube segments are axially and rotatably movable with respect to each other The axial and rotating movements may occur without separation of the segments.

A bracket attaches the second tube segment to a fixed structure of the vehicle's engine bay. The bracket includes an elastomeric isolator that absorbs engine movement. Because the engine, in operation, is subject to "rolling" or movement that is independent of the body structure of the vehicle, damage to the tube portion assembly is prevented by the movability of the first and second tube segments relative to each other and the elastomeric isolator.

The fluid-level indicating system of the disclosed inventive concept provides a system that is of relative low cost because of the utilization of the common tube segment attached to a vehicle-specific tube segment. The fluid-level indicating system of the disclosed inventive concept is also highly adaptable to different model types while providing easy access to the fluid level dipstick by the vehicle operator.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 5 is perspective view of an isolator bracket for use with the fluid level indicating system according to the disclosed inventive concept;

DETAILED DESCRIPTION OF THE PREFERRED EMBODIMENT

Figure 1:
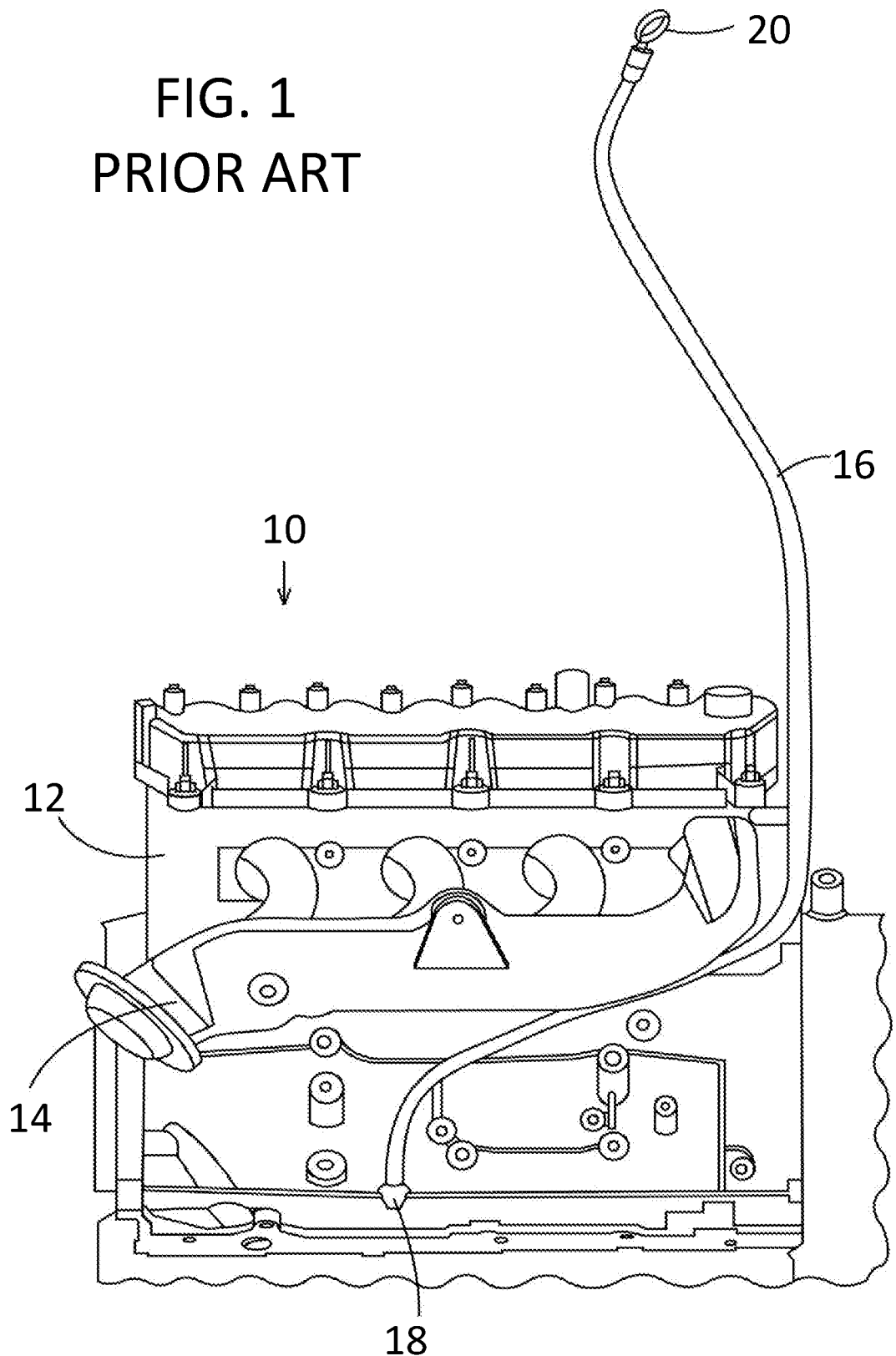
FIG. 1 is an elevated side view of an internal combustion engine having a conventional fluid level indicating system according to known technology.

In the following figures, the same reference numerals will be used to refer to the same components. In the following description, various operating parameters and components are described for different constructed embodiments. These specific parameters and components are included as examples and are not meant to be limiting.

Figure 2:
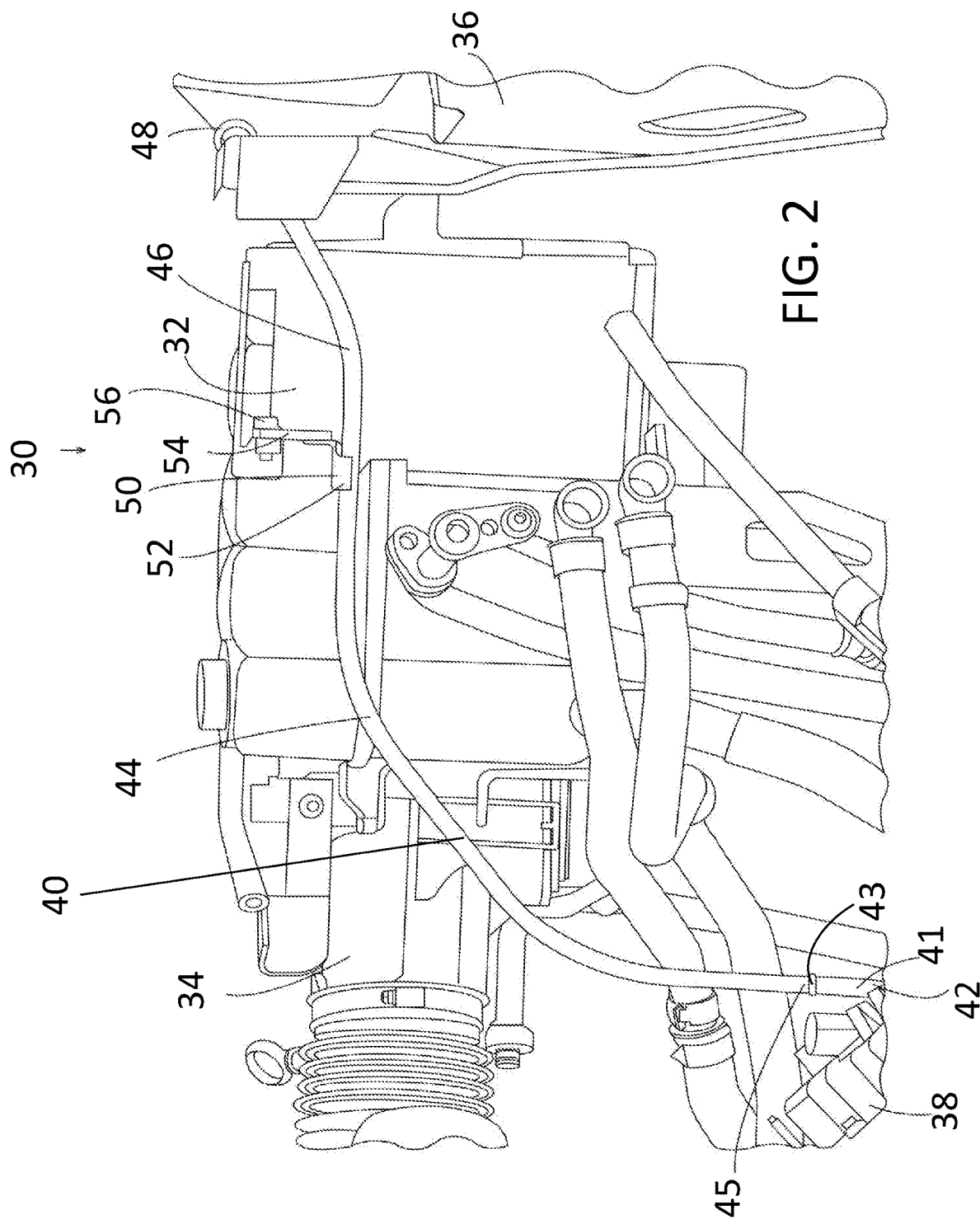
FIG. 2 is an elevated side view of a portion of an internal combustion engine having a fluid level indicating system according to the disclosed inventive concept illustrating a common tube segment fitted to the engine and a vehicle model-specific tube segment fitted between the common tube segment and a fixed structure on the automobile.
Figure 3:
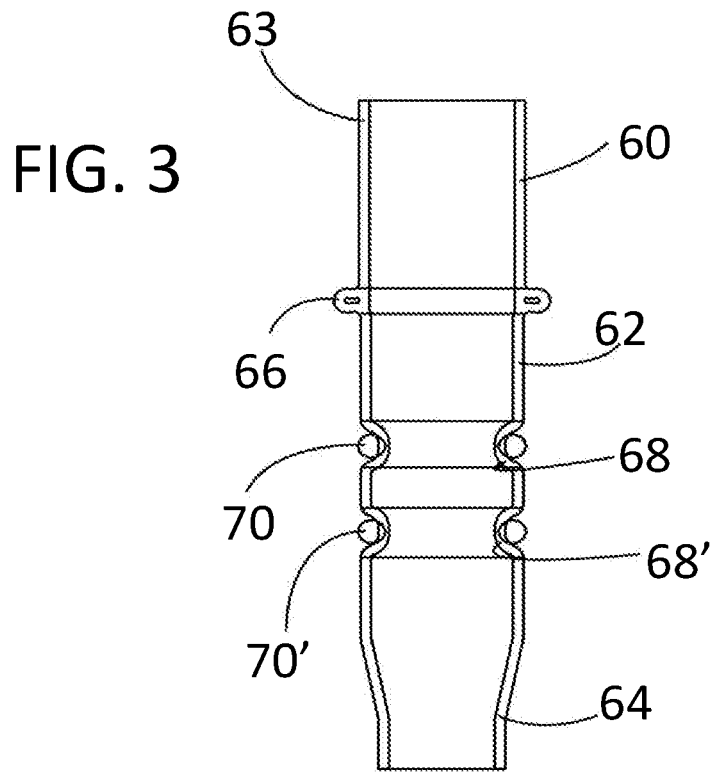
FIG. 3 is a sectional view of a common tube segment taken along its long axis.
Figure 4:
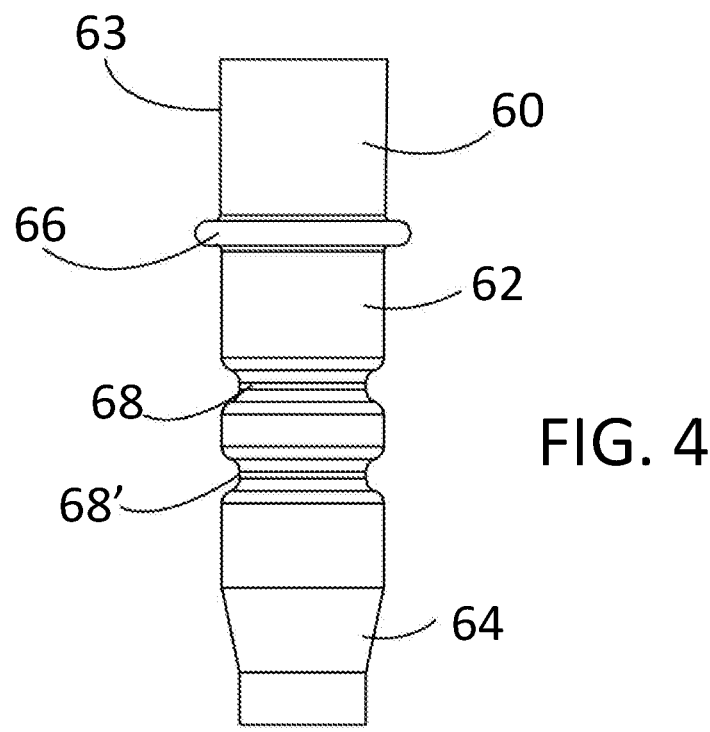
FIG. 4 is side view of the common tube segment of FIG. 3.
Figure 7:
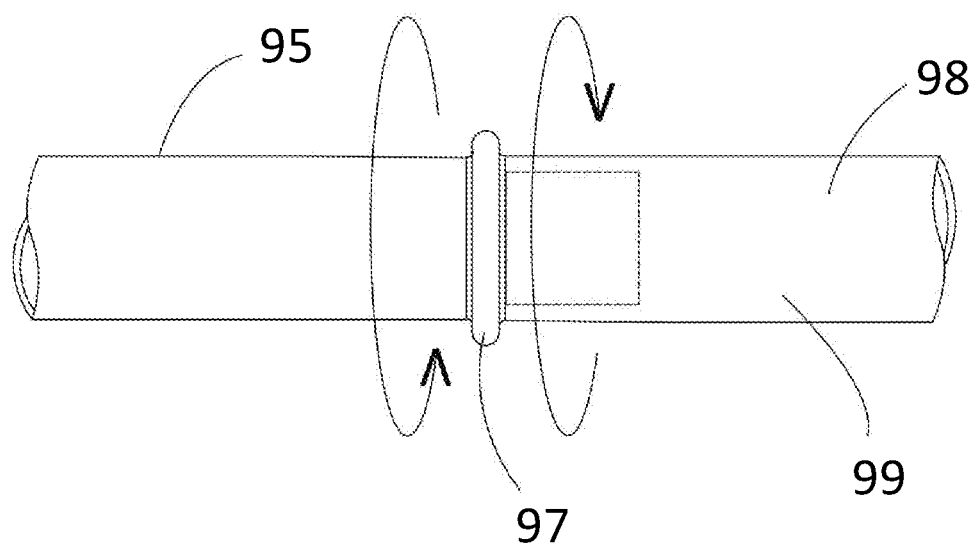
FIG. 7 is a view of portions of joined first and second segments illustrating the rotatable movability of the segments relative to one another.
Figure 8:
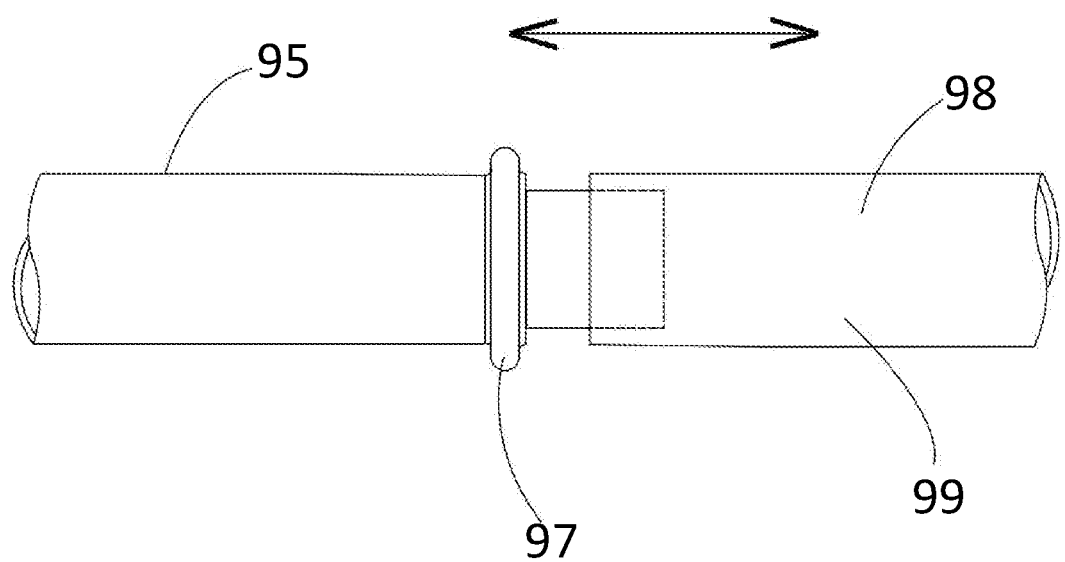
FIG. 8 is a view of portions of joined first and second segments illustrating the axial movability of the segments relative to one another.
Figure 9:
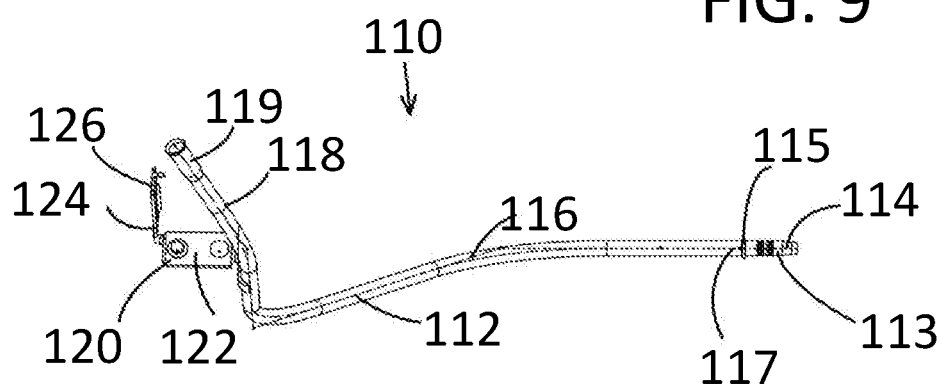
FIG. 9 is a top perspective view of a fluid level indicating system according to a further embodiment of the disclosed inventive concept.
Figure 10:
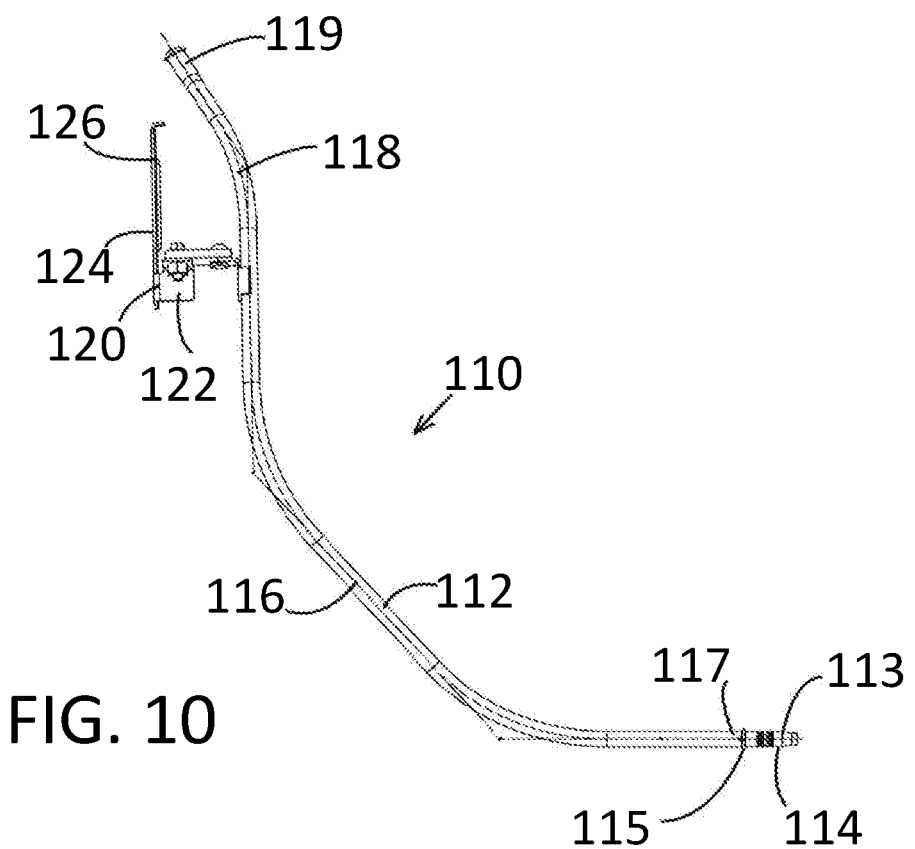
FIG. 10 is an elevated side view of the fluid level indicating system shown in FIG. 9.

In general, variations of a fluid level indicating system according to the disclosed inventive concept are illustrated in the figures. One embodiment of the fluid level indicating system according to the disclosed inventive concept is illustrated in FIG. 2. FIGS. 3 and 4 illustrate an embodiment of the common tube segment for use on one or more engines while FIG. 5 illustrates an attachment bracket for attaching the model-specific tube segment to the rigid body portion of the vehicle. FIG. 6 illustrates an additional embodiment of the disclosed inventive concept. FIGS. 7 and 8 illustrate a further embodiment of a fluid level indicating system according to the disclosed inventive concept. FIGS. 9 and 10 illustrate an additional embodiment of a fluid level indicating system according to the disclosed inventive concept. It is to be understood that the precise configurations shown in the figures are not intended as being limiting, as variations such as shape, position and size of the fluid level indicating system and its individual components can be anticipated without deviating from either the spirit or the scope of the disclosed inventive concept. It is also to be understood that while the fluid level indicating system is illustrated herein as being fitted to measure the oil level in the vehicle oil pan, the same system can be used in conjunction with other fluid reservoirs, such as with the vehicle's transmission.

Referring to FIG. 2, an elevated side view of a portion of an internal combustion engine arrangement having a fluid level indicating system according to the disclosed inventive concept is illustrated. The internal combustion engine arrangement is generally illustrated as 30. An air box 32 is provided for receiving incoming air that is drawn into the cylinders by way of an arrangement such as an air hose 34 and into the intake manifold or intake ports in the case of a fuel-injected engine. Adjacent the air box 32 is a fixed vehicle structure, such as an engine compartment side wall 36. The air box 32 and the air hose 34 are fixed to a rolling structure such as an engine block 38. In operation, the engine block 38 (and fixed structures that include the air box 32 and the air hose 34) is subject to "rolling" or movement independent of the body of the vehicle, including such fixed vehicle structures as the engine compartment side wall 36. If a conventional pre-formed, one piece fluid level indicating tube was rigidly attached at one end to the engine block 38 and at the other end to the engine compartment side wall 36, for example, the engine rolling would eventually cause a failure at one or more areas of the fluid level indicating tube.

The internal combustion engine arrangement 30 illustrated in FIG. 2 includes a fluid level indicating system 40. The fluid level indicating system 40 includes a common tube segment 41 that is fitted to the engine block 38. The common tube segment 41 is standardized for the particular engine block, regardless of vehicle model. The common tube segment 41 includes a block insertion end 42 that is inserted into an aperture formed in the engine block 38 for this purpose. The common tube segment 41 may further include a reinforcement collar 43 at one end.

Attached to the common tube segment 41 is a vehicle model-specific tube segment 44. The model-specific tube segment 44 includes an insertion end 45 that is attached to the common tube segment 41. The common tube segment 41 and the model-specific tube segment 44 may be composed of any of a variety of materials, such as but not limited to welded or seamless low carbon steel tubing.

The model-specific tube segment 44 includes a fixed structure attachment portion 46 into which an elongated fluid level instrument such as a dipstick 48 is removably inserted. The fixed structure attachment portion 46 further includes a bracket assembly 50 for attachment to a fixed structure such as the air box 32 which, as illustrated and as noted above, is attached to the engine compartment side wall 36. It is to be understood that the bracket assembly 50 may be attached to any fixed structure and may, for example, be attached directly to the engine compartment side wall 36.

The bracket assembly 50 includes a tube attachment arm 52 that is attached at one end to the fixed structure attachment portion 46 of the model-specific tube segment 44. Attached to the other end of the tube attachment arm 52 is a flexible isolator 54 which is attached to a fixed structure attachment bracket 56. The flexible isolator 54 may be composed of any elastomeric material such as, but not limited to, natural rubber, reclaimed rubber, or synthetic rubber, whether such materials are used alone or in combination. An example of a suitable isolating elastomeric material is SAE J200. The flexible isolator 54 provides a degree of flexibility for the model-specific tube segment 44 relative to the fixed structure to which it is attached. With this built-in flexibility, the fluid level indicating system 40 protected from damage by the rolling motion of the engine during operation relative to the fixed structure.

An embodiment of the common tube segment is illustrated in FIGS. 3 and 4. The common tube segment, illustrated as 60 in these figures, is shown first in sectional view in FIG. 3 and in a side view in FIG. 4. The common tube segment 60 includes a body 62 having a model-specific tube segment insertion end 63 formed at one end and an engine block insertion tip 64 formed at the other end. A depth-limiting band 66 is formed on the body 62. The depth-limiting band 66 provides an insertion stop to limit the depth to which the engine block insertion tip 64 of the common tube segment 60 may be inserted into an aperture formed in the engine block.

A fluid-tight sealing arrangement is provided on the common tube segment 60. While the sealing arrangement may be any of several constructions, a non-limiting but preferred method is the use of O-rings. A pair of radially-formed grooves 68 and 68' are formed in the body 62. An O-ring 70 is positioned in the radially-formed groove 68 and an O-ring 70' is positioned in the radially-formed groove 68'. A greater or lesser number of O-rings may be provided.

An embodiment of a bracket assembly for attaching the model-specific tube segment of the fluid level indicating system of the disclosed inventive concept is illustrated in FIG. 5. Shown therein is a bracket assembly 80. The bracket assembly 80 includes a tube attachment arm 82 that is attached to a fixed structure attachment portion 84 of a model-specific tube segment (not shown). Attached to the other end of the tube attachment arm 82 is a flexible isolator 86 which is itself attached to a fixed structure attachment bracket 88. Like the flexible isolator 54 described above, the flexible isolator 86 may be composed of any elastomeric material such as, but not limited to, synthetic or rubber.

Figure 6A:
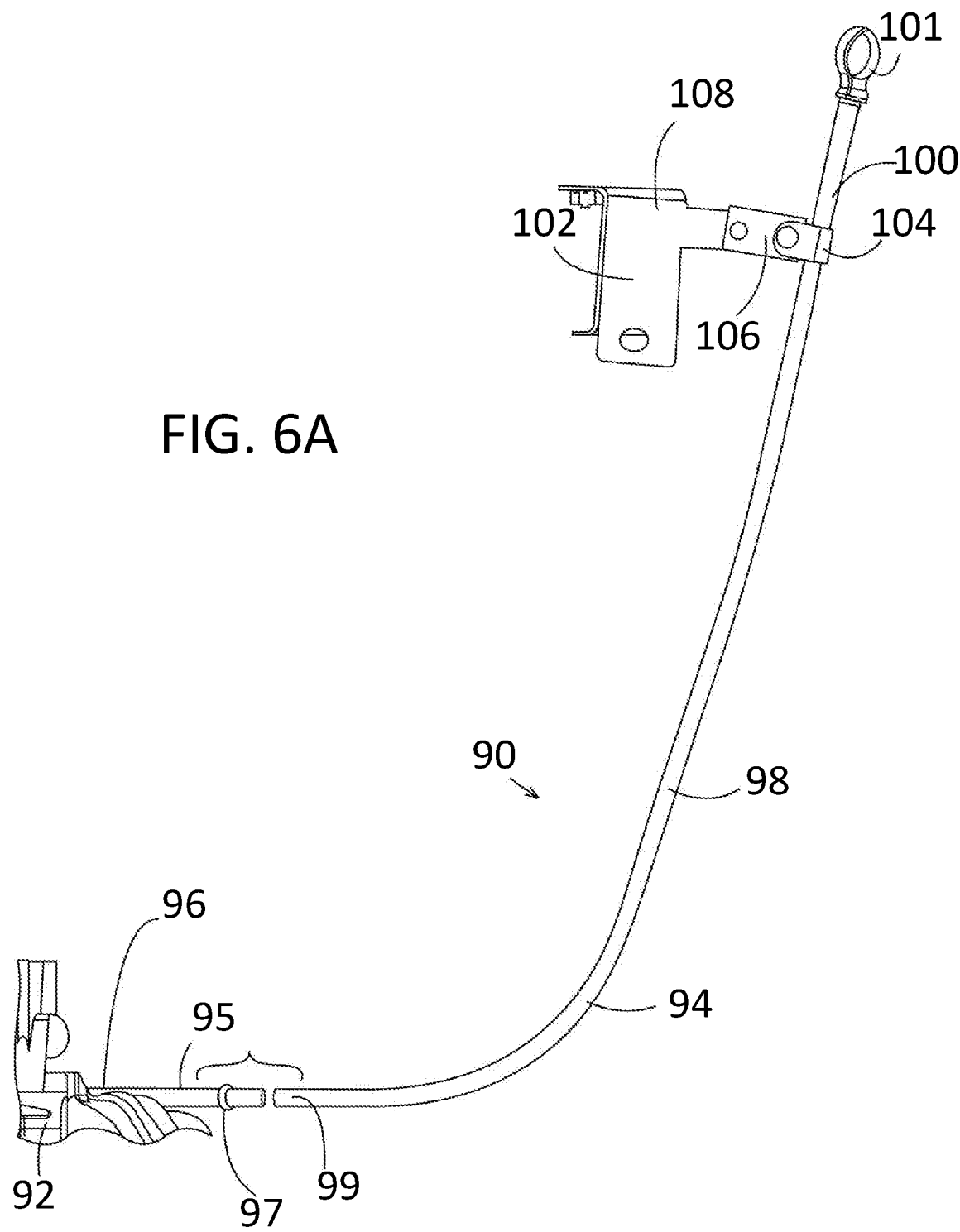
FIG. 6a is an elevated side view of a fluid level indicating system according to another embodiment of the disclosed inventive concept in which the model-specific tube segment is spaced apart from the common tube segment.
Figure 6B:
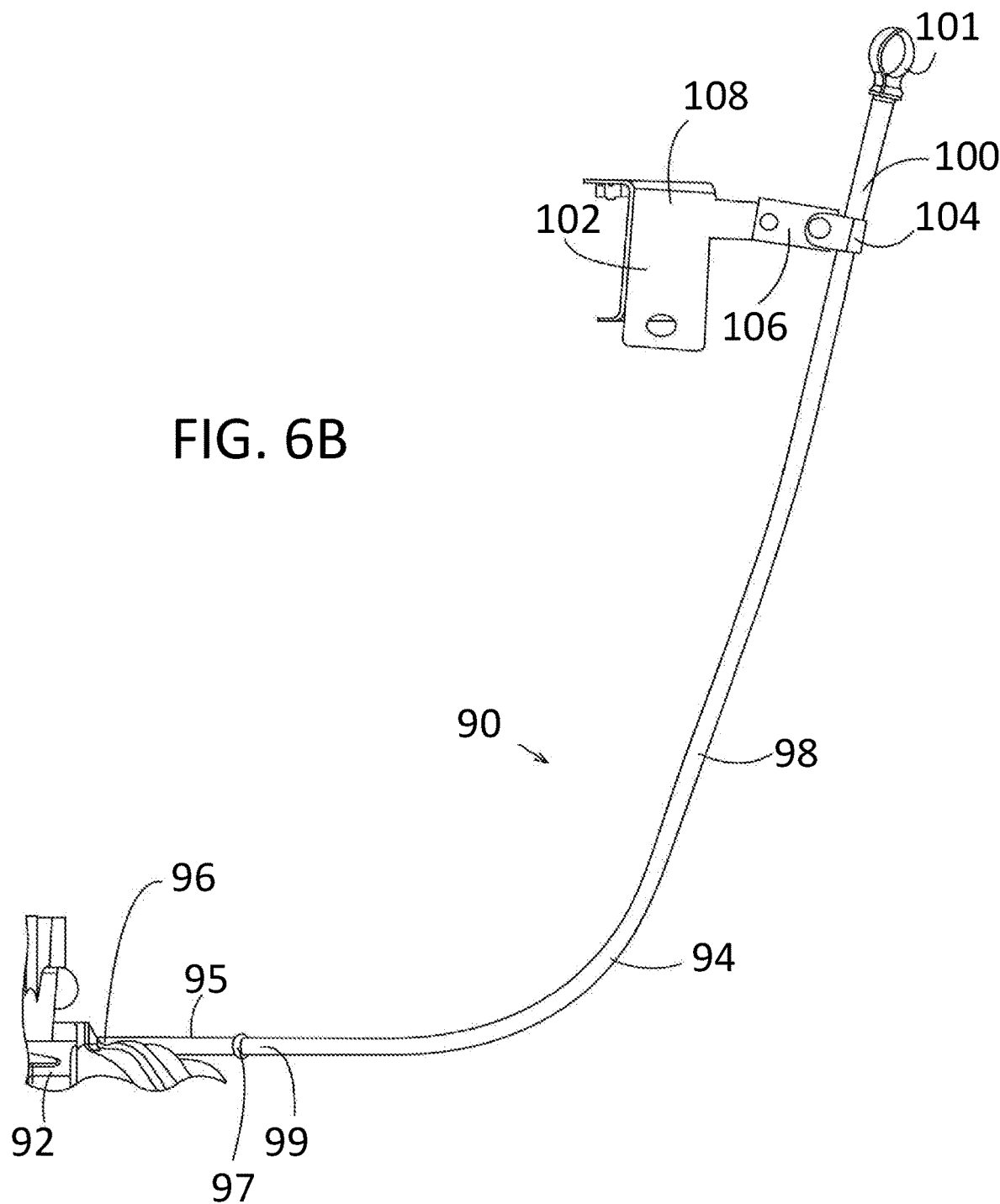
FIG. 6B is an elevated side view of the fluid level indicating system of FIG. 6A in which the model-specific tube segment is attached to the common tube segment.

FIGS. 6A and 6B are elevated side views of an alternative fluid level indicating system according to the disclosed inventive concept. The fluid level indicating system, generally illustrated as 90, illustrates similar components to those of the fluid level indicating system 40, but certain ones of the components have different configurations. The fluid level indicating system 90 is used in conjunction with an engine block 92.

The fluid level indicating system 90 includes a tube portion 94 having at one end a common tube segment 95 that is fitted to the engine block 92. The common tube segment 95 is standardized for the particular engine block, regardless of vehicle model. The common tube segment 95 includes a block insertion end 96 that is inserted into an aperture formed in the engine block 92 for this purpose. A depth-limiting band 97 is formed on the common tube segment 95.

Attached to the common tube segment 95 is a vehicle model-specific tube segment 98. The model-specific tube segment 98 includes an insertion end 99 that is attached to the common tube segment 95. The common tube segment 95 and the model-specific tube segment 98 may be composed of any of a variety of materials, such as but not limited to low carbon steel tubing. In FIG. 6A, the model-specific tube segment 98 is shown spaced apart from the common tube segment 95. In FIG. 6B, the model-specific tube segment 98 is shown attached to the common tube segment 95.

The model-specific tube segment 98 includes a fixed structure attachment portion 100 into which a dipstick 101 is removably inserted. The fixed structure attachment portion 100 further includes a bracket assembly 102 for attachment to a fixed structure on the vehicle such as the engine compartment side wall (not shown).

The bracket assembly 102 includes a tube attachment arm 104 that is attached at one end to the fixed structure attachment portion 100 of the model-specific tube segment 98. Attached to the other end of the tube attachment arm 104 is a flexible isolator 106 which is attached to a fixed structure attachment bracket 108. Like the flexible isolators 54 and 86 described above, the flexible isolator 106 may be composed of any elastomeric material such as, but not limited to, synthetic or natural rubber. The flexible isolator 106 provides a degree of flexibility for the model-specific tube segment 98 relative to the fixed structure to which it is attached.

In addition to the flexibility provided by the flexible isolator 106, the integrity of the tube portion 94 may be further protected by the movability of the common tube segment 95 relative to the vehicle model-specific tube segment 98. This movability is illustrated in FIGS. 7 and 8.

Referring to FIG. 7, the rotatable movability of the common tube segment 95 relative to the vehicle model-specific tube segment 98 is illustrated. The rotatable movability may occur without causing damage to the tube portion 94 and without resulting in separation of the common tube segment 95 from the vehicle model-specific tube segment 98.

Referring to FIG. 8, the axial movability of the common tube segment 95 relative to the vehicle model-specific tube segment 98 is illustrated. The axial movability may occur without causing damage to the tube portion 94 and without resulting in separation of the common tube segment 95 from the vehicle model-specific tube segment 98.

FIGS. 9 and 10 illustrate a further embodiment of the disclosed inventive concept. FIG. 9 illustrates a top perspective view of an alternative fluid level indicating system according to the disclosed inventive concept and FIG. 10 illustrates an elevated side view of the fluid level indicating system of FIG. 9. The fluid level indicating system, generally illustrated as 110, illustrates similar components to those of the fluid level indicating systems 40 and 90 described above and illustrated in FIGS. 2 and 6 respectively, but certain ones of the components have different configurations. The fluid level indicating system 110 is used in conjunction with an engine block (not shown).

The fluid level indicating system 110 includes a tube portion 112 having at one end a common tube segment 113 that is fitted to the engine block. The common tube segment 113 is standardized for the particular engine block, regardless of vehicle model. The common tube segment 113 includes a block insertion end 114 that is inserted into an aperture formed in the engine block for this purpose. A depth-limiting band 115 is formed on the common tube segment 113. The depth-limiting band 115 provides an insertion stop to limit the depth to which the engine block insert end of the common tube segment 113 may be inserted into an aperture formed in the engine block for receiving the block insertion end 114.

Attached to the common tube segment 113 is a vehicle model-specific tube segment 116. The model-specific tube segment 116 includes an insertion end 117 that is attached to the common tube segment 113 by insertion. The common tube segment 113 and the model-specific tube segment 116 may be composed of any of a variety of materials, such as but not limited to low carbon steel tubing.

The model-specific tube segment 116 includes a fixed structure attachment portion 118 having a dipstick-receiving end 119 into which a dipstick (not shown) is removably inserted. The fixed structure attachment portion 118 further includes a bracket assembly 120 for attachment to a fixed structure on the vehicle such as by direct attachment to the engine compartment side wall or by indirect attachment to the engine compartment side wall by attachment to, for example, an air box (not shown).

The bracket assembly 120 includes a tube attachment arm 122 that is attached at one end to the fixed structure attachment portion 118 of the model-specific tube segment 116. Attached to the other end of the tube attachment arm 122 is a flexible isolator 124 which is attached to a fixed structure attachment bracket 126. Like the flexible isolators 54, 86, and 106 described above, the flexible isolator 124 may be composed of any elastomeric material such as, but not limited to, synthetic or natural rubber. The flexible isolator 124 provides a degree of flexibility for the model-specific tube segment 116 relative to the fixed structure to which it is attached.

Figures 11, 12:
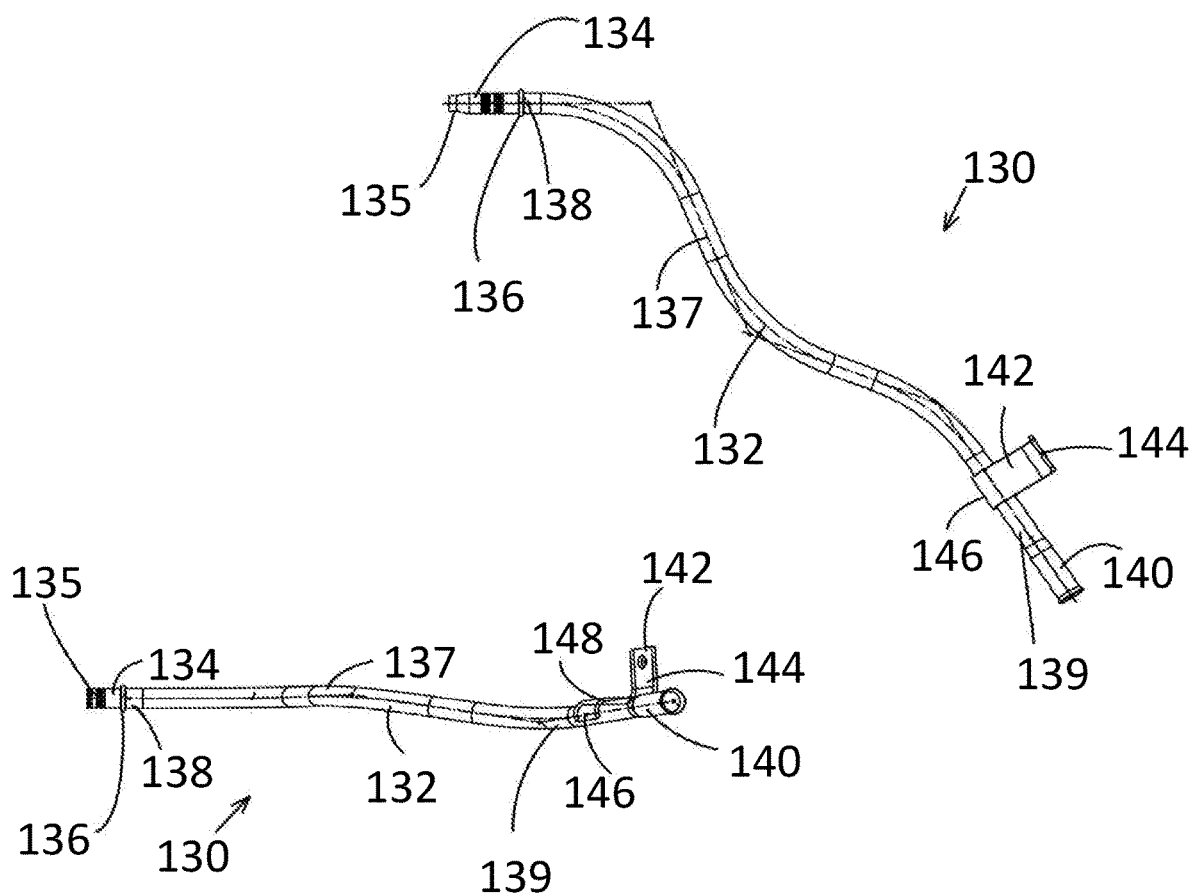
FIG. 11 is a top perspective view of a fluid level indicating system according to an additional embodiment of the disclosed inventive concept.
FIG. 12 is an elevated side view of the fluid level indicating system shown in FIG. 11.

FIGS. 11 and 12 illustrate an additional embodiment of the disclosed inventive concept. FIG. 11 illustrates a top perspective view of another alternative fluid level indicating system according to the disclosed inventive concept and FIG. 12 illustrates an elevated side view of the fluid level indicating system of FIG. 11. The fluid level indicating system, generally illustrated as 130, illustrates similar components to those of the fluid level indicating systems 40 and 90 described above and illustrated in FIGS. 2 and 6, respectively, and the fluid level indicating system 110 described above and illustrated in FIGS. 9 and 10, but certain ones of the components have different configurations. The fluid level indicating system 130 is used in conjunction with an engine block (not shown).

The fluid level indicating system 130 includes a tube portion 132 having at one end a common tube segment 134 that is fitted to the engine block. The common tube segment 134 is standardized for the particular engine block, regardless of vehicle model. The common tube segment 134 includes a block insertion end 135 that is inserted into an aperture formed in the engine block for this purpose. A depth-limiting band 136 is formed on the common tube segment 134. The depth-limiting band 136 provides an insertion stop to limit the depth to which the engine block insert end of the common tube segment 134 may be inserted into an aperture formed in the engine block for receiving the block insertion end 135.

Attached to the common tube segment 134 is a vehicle model-specific tube segment 137. The model-specific tube segment 137 includes an insertion end 138 that is attached to the common tube segment 134 by insertion. The common tube segment 134 and the model-specific tube segment 137 may be composed of any of a variety of materials, such as but not limited to low carbon steel tubing.

The model-specific tube segment 137 includes a fixed structure attachment portion 139 having a dipstick-receiving end 140 into which a dipstick (not shown) is removably inserted. The fixed structure attachment portion 139 further includes a bracket assembly 142 for attachment to a fixed structure on the vehicle such as by direct attachment to the engine compartment side wall or by indirect attachment to the engine compartment side wall by attachment to, for example, an air box (not shown).

The bracket assembly 142 includes a tube attachment arm 144 that is attached at one end to the fixed structure attachment portion 139 of the model-specific tube segment 137. Attached to the other end of the tube attachment arm 144 is a flexible isolator 146 which is attached to a fixed structure attachment bracket 148. Like the flexible isolators 54, 86, 106, and 124 described above, the flexible isolator 146 may be composed of any elastomeric material such as, but not limited to, synthetic or natural rubber. The flexible isolator 146 provides a degree of flexibility for the model-specific tube segment 137 relative to the fixed structure to which it is attached.

The disclosed inventive concept overcomes the challenges faced by known fluid level indicating systems. By providing a system that incorporates a common tube segment and a model-specific tube segment, manufacturing costs can be reduced by allowing the use of a larger bulk of common tube segments while maintaining at a minimum the amount of material needed for use in the model-specific tube segments. In addition, by providing a two-piece fluid level tube, the arrangement may be easily adapted for use over a wide variety of vehicle models. Furthermore, the movability of the first and second tube segments relative to each other and the action of the elastomeric isolator both function to absorb motion from the engine, thereby minimizing the risk of damage to the fluid level tube. Accordingly, the disclosed inventive concept provides a cost-effective approach to a fluid level indicating system that is usable over a wide range of vehicle types having a common engine that can be attached between the engine and a fixed vehicle structure without damage to the tube segments. Because of its ready adaptability, the fluid level indicating system provides easy hand access to the dipstick by the operator.

One skilled in the art will readily recognize from the above discussion, and from the accompanying drawings and claims, that various changes, modifications and variations can be made therein without departing from the true spirit and fair scope of the invention as defined by the following claims.

What is claimed is:

1. A fluid level indicating system for use in a vehicle, the system comprising:
   a fixed structure forming part of the vehicle;
   an engine operatively associated with the vehicle, the engine having a fluid reservoir;
   a first tube segment fluidly associated with said reservoir;
   a second tube segment attached to said structure, said tube segments being movably attached to one another; and
   a fluid measuring dipstick insertable through said tube segments and into said fluid reservoir.

2. The fluid level indicating system of claim 1, further including an isolator between said fixed structure and said second tube segment.

3. The fluid level indicating system of claim 2, wherein said isolator is composed of an elastomeric material.

4. The fluid level indicating system of claim 2, further including an attachment bracket between said second tube segment and said fixed structure, said attachment bracket including a tube segment portion and a fixed structure portion, said isolator being positioned between said portions.

5. The fluid level indicating system of claim 1, wherein said segments are axially and rotatably movable with respect to each other.

6. The fluid level indicating system of claim 1, wherein said first tube segment includes a fluid sealing arrangement.

7. The fluid level indicating system of claim 6, wherein said fluid sealing arrangement includes a radially-formed groove in said first tube segment and an O-ring positioned in said radially-formed groove.

8. The fluid level indicating system of claim 1, wherein said first tube segment includes an insertion end and said second tube segment includes an insertion tip, said insertion tip of said second tube segment being inserted into said insertion end of said first tube segment.

9. The fluid indicating system of claim 1, further including a depth-limiting band provided on said first tube segment.

10. A fluid level indicating system for use in a vehicle, the system comprising:
a fixed structure forming part of the vehicle;
an engine operatively associated with the vehicle;
a tube for receiving an elongated fluid level measuring instrument, said tube including multiple segments and an engine attachment end and a fixed structure attachment end, said segments being movably attached to one another; and
a support bracket between said structure and said fixed structure attachment end.

11. The fluid level indicating system of claim 10, wherein said engine further includes a fluid reservoir.

12. The fluid level indicating system of claim 11, wherein said elongated fluid level measuring instrument is insertable through said tube and into said fluid reservoir.

13. The fluid level indicating system of claim 10, wherein said support bracket includes an isolator between said fixed structure and said fixed structure attachment end of said tube.

14. The fluid level indicating system of claim 10, wherein said segments include a first tube segment fluidly associated with said fluid reservoir and a second tube segment attached to said first tube segment and to said support bracket.

15. The fluid level indicating system of claim 10, wherein said segments are axially and rotatably movable with respect to each other.

16. The fluid level indicating system of claim 14, wherein said fluid sealing arrangement includes a radially-formed groove formed in said first tube segment and an O-ring positioned in said radially-formed groove.

17. The fluid level indicating system of claim 16, wherein said first tube segment includes an insertion end and said second tube segment includes an insertion tip, said insertion tip of said second tube segment being inserted into said insertion end of said first tube segment.

18. The fluid indicating system of claim 17, further including a depth-limiting band provided on said first tube segment.

19. A fluid level indicating system for use in a vehicle having an engine and a fixed structure, the system comprising:
a first tube segment including an engine attachment end;
a second tube segment formed separate from said first tube segment, said second tube segment movably attached to said first tube segment and including a fixed structure attachment end; and
a bracket between the fixed structure attachment end and the fixed structure, said bracket including an elastomeric isolator.

20. The fluid level indicating system of claim 19, further including an elongated fluid level measuring instrument removably insertable into said first and second tube segments.

* * * * *